United States Patent
Johnson

(10) Patent No.: US 8,857,825 B1
(45) Date of Patent: Oct. 14, 2014

(54) ICE FISH HOUSE BASE AND EXPANSION LEVER

(71) Applicant: Richard A Johnson, Princeton, MN (US)

(72) Inventor: Richard A Johnson, Princeton, MN (US)

( * ) Notice: Subject to any disclaimer, the term of this patent is extended or adjusted under 35 U.S.C. 154(b) by 0 days.

(21) Appl. No.: 13/953,675

(22) Filed: Jul. 29, 2013

Related U.S. Application Data

(60) Provisional application No. 61/676,884, filed on Jul. 27, 2012.

(51) Int. Cl.
 *B62B 9/04* (2006.01)
 *B60D 1/24* (2006.01)
 *A01K 97/01* (2006.01)

(52) U.S. Cl.
 CPC .. *A01K 97/01* (2013.01); *B60D 1/24* (2013.01)
 USPC ...................................................... 280/19.1

(58) Field of Classification Search
 CPC .............. B60P 3/34; E04H 15/06; B60D 1/14
 USPC ......... 280/15, 18, 19, 19.1, 24, 809, 810, 845
 See application file for complete search history.

(56) References Cited

U.S. PATENT DOCUMENTS

| | | |
|---|---|---|
| 2,464,884 A | 3/1949 | Noyes |
| 2,473,076 A | 6/1949 | Carl |
| 2,546,730 A | 3/1951 | Fred |
| 2,632,454 A | 3/1953 | Sherman |
| 2,737,397 A | 3/1956 | Turner |
| 2,780,471 A | 2/1957 | Lempke |
| 2,781,766 A | 2/1957 | Krieger |
| 2,891,562 A | 6/1959 | Anthony |
| 3,464,735 A * | 9/1969 | Smith ............................ 296/169 |
| 3,492,015 A * | 1/1970 | Kuhn et al. ................... 280/19.1 |
| 3,507,293 A * | 4/1970 | Du Bray ....................... 280/19.1 |
| 3,826,270 A * | 7/1974 | Hentges ........................ 280/19.1 |
| 3,971,395 A | 7/1976 | Lipinski |
| 4,067,347 A * | 1/1978 | Lipinski ......................... 126/624 |
| 4,239,247 A * | 12/1980 | Hinz ............................ 280/19.1 |
| 4,252,136 A * | 2/1981 | Kruczynski ................... 135/148 |
| 4,456,272 A * | 6/1984 | Kroeger ....................... 280/19.1 |
| 4,631,877 A * | 12/1986 | Molodecki ........................ 52/70 |
| 5,174,591 A * | 12/1992 | Shappell .......................... 280/20 |
| 5,622,198 A * | 4/1997 | Elsinger ........................ 135/128 |
| 5,653,456 A | 8/1997 | Mough |
| 5,918,890 A * | 7/1999 | Willems ........................... 280/24 |
| 6,712,379 B2 | 3/2004 | Graham et al. |
| 7,226,058 B2 * | 6/2007 | Bouchard ....................... 280/15 |
| 2008/0284134 A1 | 11/2008 | Temple |

\* cited by examiner

*Primary Examiner* — John Walters
*Assistant Examiner* — James Triggs
(74) *Attorney, Agent, or Firm* — Albert W. Watkins

(57) ABSTRACT

An ice fish house base has at least two skis, each coupled through at least two pivotal arms to an ice house base. The pivotal arms are pivotal between an elevated position and a lowered minimum position. The lowered position is stable when the ice house base comes into solid contact with the ground, thereby limiting maximum rotation in this ice-house-base-lowered position. In the upward position, a rotational pivotal arm stop prevents the pivotal arms from rotating further, so that the separation between ice house base and skis is just less than maximum. The weight of the ice house will also hold the ice house base at this fully rotated position. A quick attach receiver is provided for a bifurcated ice auger mount and several alternative accessory supports. In addition, several alternative trailer hitch couplers are disclosed that use a tensioning strap for securement.

9 Claims, 6 Drawing Sheets

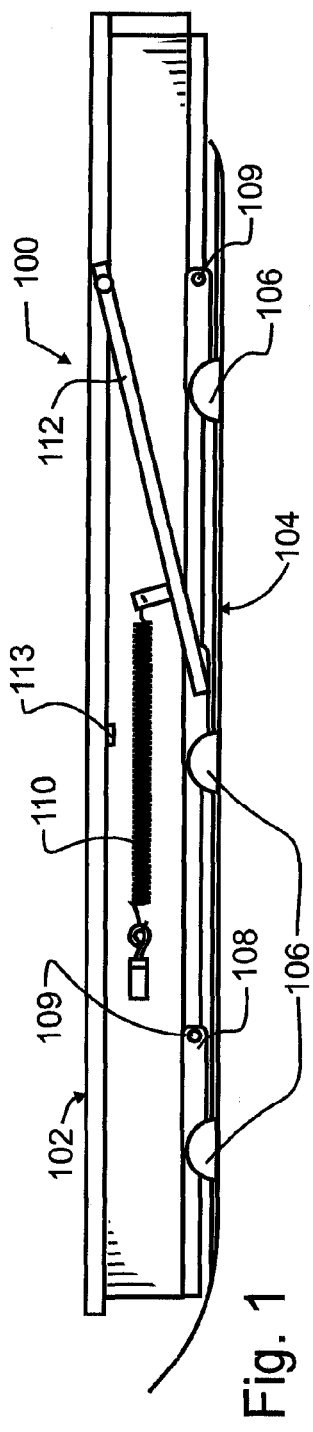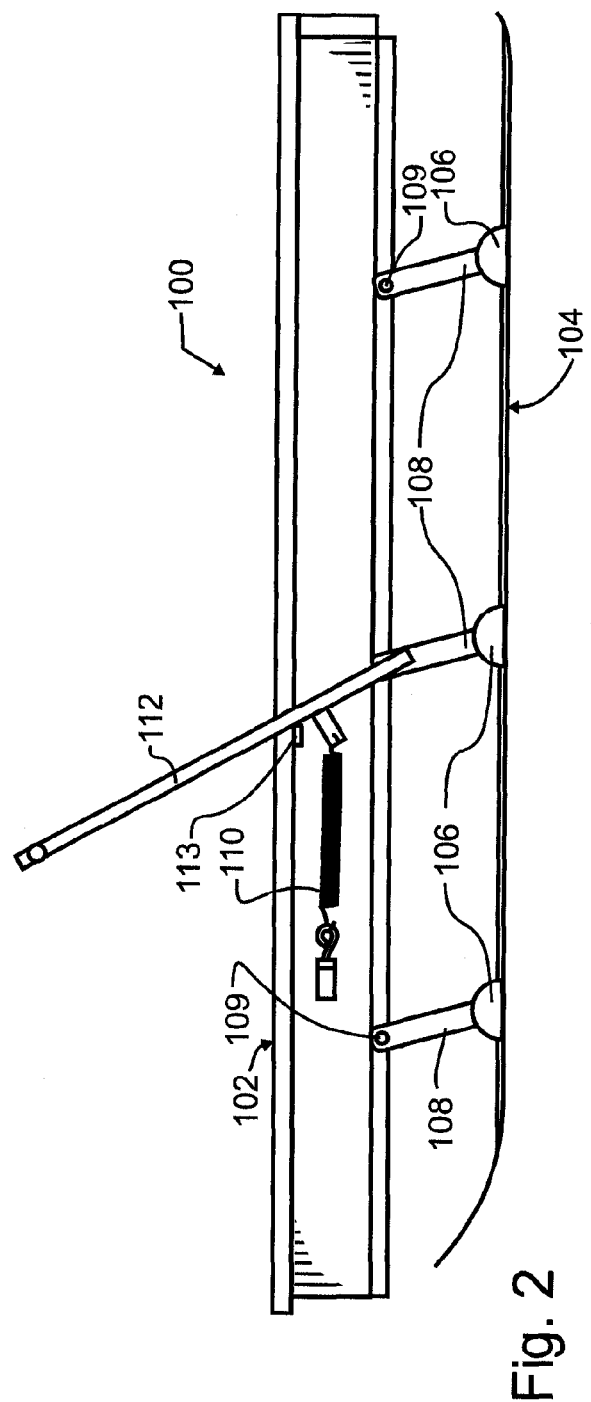
Fig. 1
Fig. 2

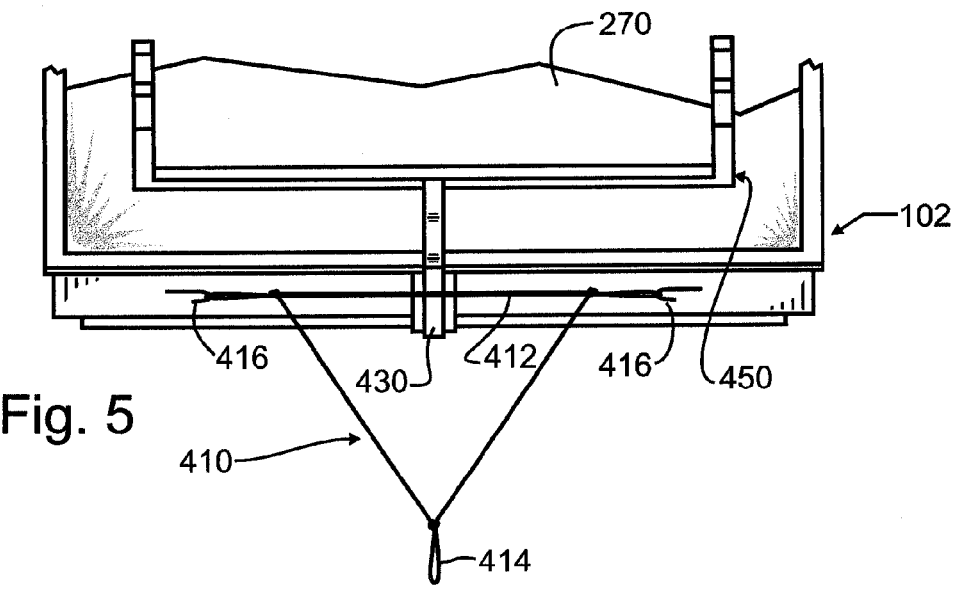
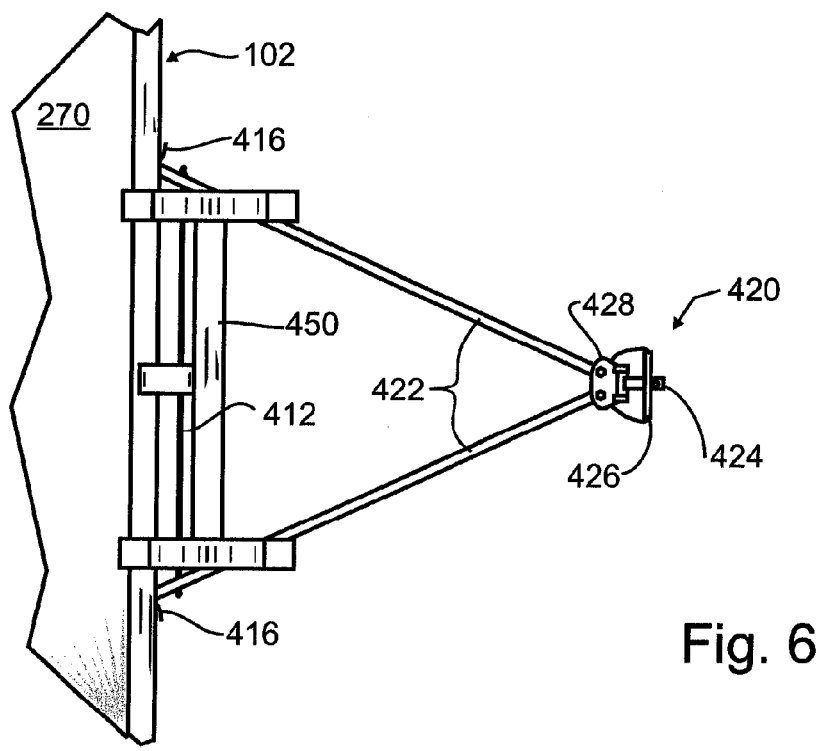

ICE FISH HOUSE BASE AND EXPANSION LEVER

CROSS REFERENCE TO RELATED APPLICATIONS

This application claims the benefit under 35 USC 119(e) of provisional patent application No. 61/676,884 filed Jul. 27, 2012.

BACKGROUND OF THE INVENTION

1. Field of the Invention

This invention pertains generally to land vehicles, and more particularly to lightweight, collapsible shelter sleds intended for use in ice fishing.

2. Description of the Related Art

For all humans, there are several essential needs that must be met. Among these is the need for food. This basic need has throughout the ages dictated many activities, and has also led to many advances and discoveries.

In northern latitudes, during the long winter months there is no opportunity to grow or harvest plants or grains of any type. Where sufficiently large and deep bodies of water are present to maintain fresh water below ice, fish survive the winter months. Many bodies of water in these northern latitudes hold bounties of fish that provide sustenance and other benefits to mankind. Unfortunately, these bodies of water are also covered by ice for a substantial part of the winter, severely limiting access.

Nevertheless, these fish, if retrieved, make an excellent source of food and nutrients. They are often both tastier and nutritionally superior to the alternative foods available locally in these winter months. As a result, fish have long been used as a winter food source. The only challenge then is retrieving them in a desirable and appropriate way, especially in the severe conditions of winter. In view of the historical importance of fish to winter survival, much effort has been made over the years to improve upon both the comfort and success of ice fishing.

For many people today food may be plentiful, but there is still much satisfaction to be gained in the sport of fishing. In some cases this may simply be a return to one's roots, or a refreshing visit to what times of old involved. In other cases, the combination of time in the relatively unspoiled outdoors and the opportunity to meet one's basic needs combine to provide great satisfaction. In yet other cases, the time away from hectic life in the city and opportunity to socialize in a more private environment provides an excellent change of pace. Regardless of the specific reasons, millions of individuals at least on occasion continue to participate in the sport of fishing. Consequently, the sport of ice fishing has evolved from what may have been an essential tool for survival in the northern latitudes many years ago.

Ice fishing is widely practiced throughout the world, by persons of all ages and backgrounds. The ice fisherman will first make a hole in ice formed on a body of water, and then will pass a line terminated by an artificially or live-baited hook through the hole. When a fisherman embarks upon a fishing trip, whether for an afternoon or a multiple day trip, one part of the preparation is the securing of supplies. Frequently, a fisherman will carry many diverse components, including tools, various live and artificial baits, hooks, leaders, weights, bobbers, stringers, and the like.

Ice fishing involves waiting for potentially extended time periods upon the frozen surface of a body of water for fish to bite. During such a wait, it is decidedly more comfortable to be protected from extreme cold and possible wind gusts which are necessarily associated with the presence of the ice. When temperatures fall below zero on the Fahrenheit scale, and when the winds begin to blow, frostbite occurs in only a few minutes on exposed skin. A shelter, commonly referred to as an ice house, provides the added protection and comfort desirable in such conditions. Understandably, in the colder climates, such shelters have gained wide acceptance, since they not only provide protection against immediate exposure to the elements, but also because they can provide further amenities such as sleeping quarters and longer term stays in the event of an unexpected blizzard or storm, cooking space, and shelter for gear, electronic devices, and many other amenities.

Unfortunately, such shelters tend to be heavy, awkward, and not readily transported. Consequently, ice houses can be especially difficult to set up in remote locations. Even for more accessible locations, typical ice houses pose difficulties in transportation and tend to be left out all winter. Other complications can arise when the ice house is left out all winter. For example, snow and ice can build up inside of the ice houses from being walked in, making the floor slippery. Another complication arises if the top layer of ice melts on a particularly warm day because the ice house can become frozen to the lake when it refreezes, making removal difficult or impossible until the lake starts melting again. Also, if the weather warms up significantly before one has a chance to retrieve the ice house, the ice house will be irretrievable and end up at the bottom of the lake. Furthermore, in order to even get a traditional ice house on the lake can require a larger vehicle, such as a truck, to drive out onto the ice, which can be dangerous. In some locales, there are restrictions upon when a semi-permanent shelter must be removed. The removal date is commonly set early enough to allow the large vehicles access, and ensure that the ice houses do not become submerged. Consequently, a portable ice house can be used later in the season than a semi-permanent shelter.

Portability also offers another important benefit in the art of ice fishing. As is well-known, fish are not predictable, and may move from day to day to different locations about the lake. A fixed shelter cannot be moved to better fishing locations, while a portable shelter could.

Solutions to these problems can be found in the prior art. Some artisans have designed fish houses with floors that define a sled. Exemplary patents, the contents and teachings which are incorporated herein by reference, include U.S. Pat. No. 2,546,730 by Dickerson, entitled "Ice-fishing shelter"; U.S. Pat. No. 2,632,454 by Skogen, entitled "Collapsible ice fishing shelter"; U.S. Pat. No. 3,492,015 by Kuhn et al, entitled "Combined sled and collapsible shelter"; U.S. Pat. No. 3,507,293 by Du Bray, entitled "Portable and collapsible fish house"; and U.S. Pat. No. 4,239,247 by Hinz, entitled "Portable angling house". These fish houses are generally portable, but require that the bottom of the shelter be extremely durable, since the bottom of the shelter may collide with obstacles such as tree branches, chunks of ice or the like while the fish house is being dragged about. Further, over time the fish house floor will be worn down through abrasion, whether directly on ice or on the occasional roadway that might be traversed. To toughen the fish house, extra material is required across the entire floor, making these fish houses substantially heavier than an ordinary person can easily handle, or alternatively too fragile for regular use, or in a further alternative, too expensive due to the need for exotic materials such as expensive graphite or Kevlar™ composites. When the floor is damaged or wears out due to impacts or abrasion, repair and replacement of the entire fish house floor is both undesirably expensive, in part due to the large quantity of material required, and difficult for the typical fisherman. In addition, the larger area in contact with the ground creates undesirable and substantial drag when traversing fresh or uneven snow. This large frontal area will also readily snag on sudden level transitions. In other words, when there is a relatively small ridge or elevational change, the large leading edge of these sleds will collide with the ridge and potentially damage either the ice house or the towing vehicle, rather than climbing or cutting through the ridge.

Some artisans have designed rigid wall shelters that are transported on skis. Exemplary patents, the contents and teachings which are incorporated herein by reference, include: U.S. Pat. No. 4,067,347 by Lipinski, entitled "Solar heated shelter with moveable secondary roof"; U.S. Pat. No. 4,456,272 by Kroeger, entitled "Hunting blind and ice fishing shed"; and U.S. Pat. No. 4,631,877 by Molodecki, entitled "Collapsible hut". Like the floors that define a sled, these fish houses are substantially heavier than suitable for easy carrying by a single person.

Other artisans have designed shelters that are provided with skis. Exemplary patents, the contents and teachings which are incorporated herein by reference, include: U.S. Pat. No. 2,464,884 by Noyes, entitled "Sled shelter"; U.S. Pat. No. 2,737,397 by Turner, entitled "Combination sled and portable shelter"; U.S. Pat. No. 2,780,471 by Lempke, entitled "Portable knockdown shelter for ice fishing"; U.S. Pat. No. 3,464,735 by Smith, entitled "Snowmobile Camper"; U.S. Pat. No. 3,826,270 by Hentges, entitled "Collapsible Ice Fishing House"; and U.S. Pat. No. 5,622,198 by Elsinger, entitled "Portable collapsible shelter". Additional artisans have designed ice fish houses with skis and tow hooks. Exemplary patents, the contents and teachings which are incorporated herein by reference, include: U.S. Pat. No. 5,653,456 by Mough, entitled "Ski system for ice fishing shanties"; U.S. Pat. No. 3,971,395 by Lipinski, entitled "Collapsible self-storing shelter"; and U.S. Pat. No. 2,473,076 by Scheibner, entitled "Collapsible structure for ice fishing". While these ski shelters overcome the weight issues of the prior art described herein above, and are generally much easier and safer to tow, these shelters elevate the floor of the fish house by the clearance between the fish house floor and the ski bottoms. In other words, when more clearance is provided to traverse heavier snow coverings, this same clearance is a hinderance for the fisherman later since this creates an undesirable gap between fish house floor and the ice surface. Consequently, the more transportable the shelter, the less desirable to use for ice fishing.

One artisan has attempted to overcome the limitations of these prior inventions by designing a collapsible runner for supporting cargo including collapsible shelters. U.S. Pat. No. 5,174,591 by Shappell, entitled "Extendable nesting ski support", the teachings and contents which are incorporated herein by reference, shows a collapsible ski. Unfortunately, the ski must flex substantially between the lowered and elevated positions, which leads to substantial material fatigue and ultimate failure. Further, since the ski must be capable of substantial flexure, the ski must necessarily be relatively soft and flexible, making it less effective at traversing irregular surfaces or passing effectively over larger obstacles.

Additional patents, the teachings and contents which are incorporated herein by reference, include: U.S. Pat. No. 7,226,058 by Bouchard, entitled "Sled for transporting a power auger vertically across ice"; U.S. Pat. No. 5,918,890 by Willems, entitled "Transportable fish house"; U.S. Pat. No. 6,712,379 by Graham et al, entitled "Lifting and towing device and method of using same"; 2008/0284134 by Temple, entitled "Tow hitch hook and method of use"; U.S. Pat. No. 4,252,136 by Kruczynski, entitled "Erectable-collapsible enclosure structure"; U.S. Pat. No. 2,891,562 by Kruczynski, entitled "Collapsible ice shanty sled"; and U.S. Pat. No. 2,781,766 by Krieger, entitled "Collapsible and portable outdoor shelter".

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is an ice fish house base and expansion lever. The base includes a first ski and a second ski. A first pair of arms are pivotally coupled between and to the first ski and ice house base. A second pair of arms are pivotally coupled between and to the second ski and said ice house base. A link between the first pair of arms and second pair of arms transmits a rotary movement of the first pair of arms relative to the ice house base from the first pair of arms to the second pair of arms, to thereby cause a rotary movement of the second pair of arms relative to said ice house base. A stop limits rotary movement of the first pair of arms relative to the ice house base from a position where a bottom of the ice house base is adjacent to a bottom of the first ski to a position where the ice house base weight maintains the stop.

In a second manifestation, the invention is, in combination, an ice fish house base, an ice auger receiver coupled to the ice fish house base, and an ice auger mount coupled through the ice auger receiver to the ice fish house base. The ice auger receiver comprises a generally tubular receiver into which a generally tubular coupler member of the ice auger mount is received. The ice auger mount has first and second bifurcated arms that operatively support distal portions of an ice auger nested therein.

In a third manifestation, the invention is a quick attach tow cord coupling for coupling a trailer to a towing vehicle. A pair of distally spaced and oppositely facing u-shaped hooks are anchored to the trailer. A flaccid cord has loops at each terminus. The flaccid cord loops each engage one of the distally spaced u-shaped hooks. A coupling is provided intermediate to the termini and is operatively engaging with a towing vehicle. An elastic tensioning member is affixed at a first terminus intermediate to a first flaccid cord terminus and the intermediate coupling and at a second terminus intermediate to a second flaccid cord terminus distal to the first flaccid cord terminus and the intermediate coupling and applying tension there between.

OBJECTS OF THE INVENTION

Exemplary embodiments of the present invention solve inadequacies of the prior art by providing an ice fish house base and expansion lever. The base is comprised by at least two skis, each coupled through at least two pivotal arms to an ice house base. The pivotal arms are pivotal between an elevated position and a lowered minimum position. The lowered position is stable when the ice house base comes into solid contact with the ground, thereby limiting maximum rotation in this ice-house-base-lowered position. In the upward position, a rotational pivotal arm stop prevents the pivotal arms from rotating further, so that the separation between ice house base and skis is just less than maximum. The forward direction of travel will through friction pull the skis and in turn rotate the pivotal arms towards the pivotal arm stop. If the rotation is permitted to travel from a minimum where the ice house base is adjacent the ground to maximum separation, and then come down slightly therefrom, gravity will also hold the ice house base at this fully rotated position, since the weight of the ice house will press the pivotal arms against the stops.

A first object of the invention is to provide an ice shelter which can be collapsed and folded to a manageable size and weight for transportation. A second object of the invention is to provide an ice shelter which is rapidly and easily set-up for use and collapse for transport, without requiring tools or dexterity, to diminish exposure time to the dangerous elements in very cold climates. Another object of the present invention is to provide skis that are relatively rigid for effectively traversing diverse surfaces, while still enabling the shelter floor to drop to the surface of the ice. A further object of the invention is to enable the shelter to be conveniently towed by a wide variety of vehicles using diverse hitches. Yet another object of the present invention is to provide convenient transport of diverse apparatus that might be useful for ice fishing.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIGS. 1 and 2 illustrate a preferred embodiment ice fish house base and expansion lever designed in accord with the teachings of the present invention from a left side elevational view, showing alternate positions of the skis and lever;

FIG. 5 illustrates the preferred embodiment ice house base from a partial and perspective view, illustrating the preferred cord attach and tightener and illustrating the optional preferred ice auger mount with receiver connection;

FIG. 6 illustrates the preferred embodiment ice house base from an enlarged and top view, illustrating an alternative trailer tongue and optional preferred ice auger mount;

DESCRIPTION OF THE PREFERRED EMBODIMENT

Figure 3:
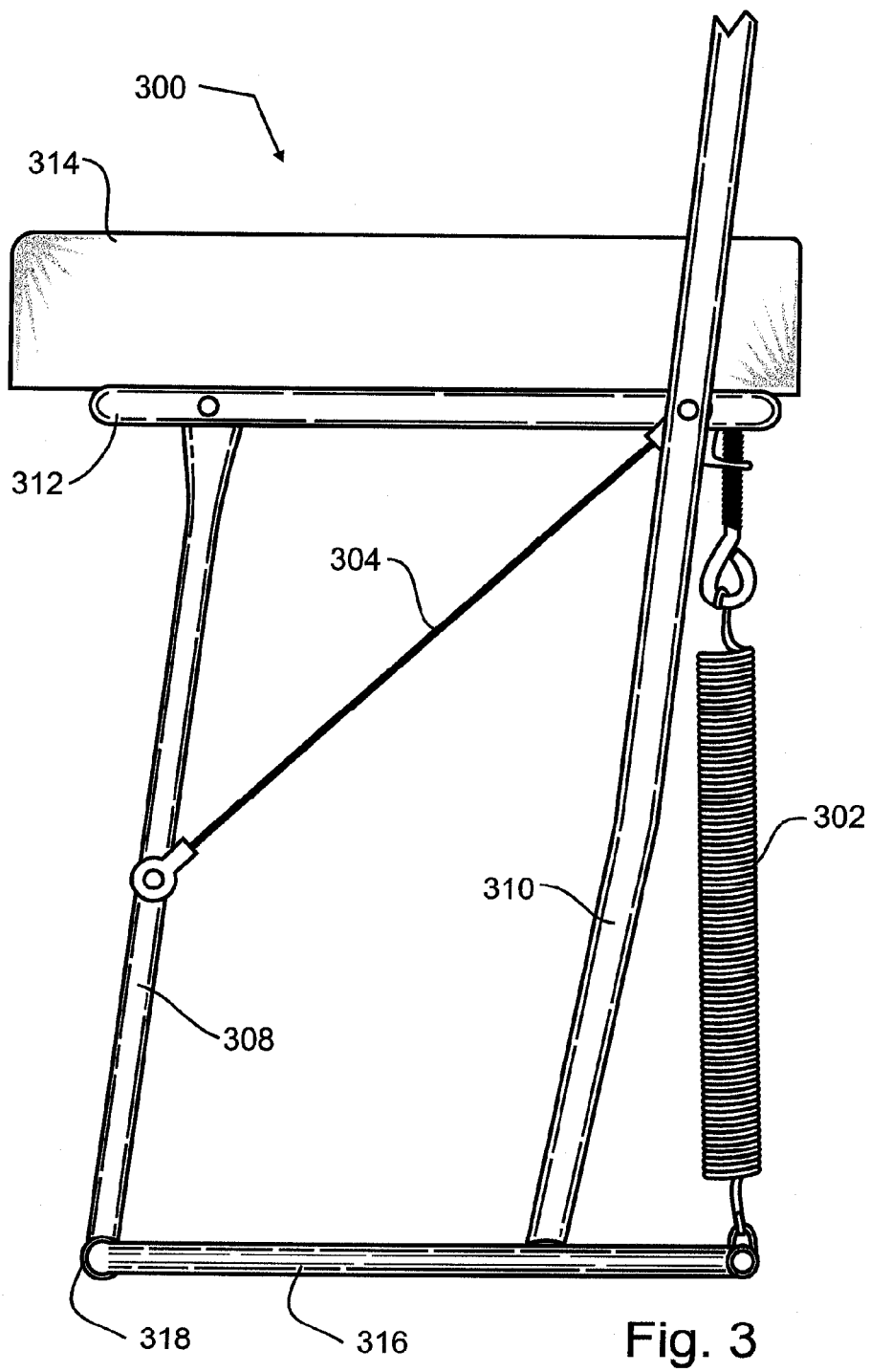
FIG. 3 illustrates a preferred embodiment collapsible seat used in the preferred embodiment ice fish house base and expansion lever of FIG. 1 from a left side elevational view.

In a preferred embodiment of the invention illustrated in FIGS. 1-5, a preferred embodiment ice fish house base and expansion lever 100 is comprised of a pair of skis 104 coupled through six pivotal arms 108 to an ice house base 102 While not essential to the operation of the invention, the skis 104 are each coupled through rotational brackets 106 to a set of three pivotal arms 108 generally fore, center, and aft on the skis to allow flexure and bend within the skis. This flexure enables somewhat better surface travel over irregularities.

The medial pivotal arm 108 is rigidly affixed to expansion lever 112 illustrated in FIGS. 1 and 2. The pivotal arms 108 are preferably pivoted by rotation of expansion lever 112. The pivotal arms 108 are pivotal between a lowered minimum position illustrated in FIG. 1 and an elevated position illustrated in FIG. 2. The lowered position is stable when ice house base 102 comes into solid contact with the ground, thereby limiting maximum rotation in this ice-house-base-lowered position. In the upward position shown in FIG. 2, an expansion lever stop 113 is provided that prevents expansion lever 112 from rotating beyond that shown, so that the separation between ice house base 102 and skis 104 is just less than maximum. A lock may additionally be provided to hold this expansion lever position, but is not necessary and not included in the preferred embodiment. The forward direction of travel, which is to the left as illustrated in FIG. 2, will through friction pull skis 104 and in turn rotate expansion lever 112 towards the expansion lever stop 113. If the rotation is permitted to travel from a minimum where ice house base 102 is adjacent the ground to a maximum separation, and then come down slightly therefrom, gravity will also hold the ice house base at this fully rotated position, since the weight of the ice house will press the pivotal arms against the stops.

A lift assist spring 110 is preferably provided to assist a person rotating expansion lever 112 and pivotal arms 108. In the preferred embodiment, this lift assist spring 110 is a tension helically coiled spring, though any suitable spring or other equivalent force-biasing apparatus may be provided as desired which will provide a rotational biasing force to the pivotal arms. Optionally, lift assist spring 110 may be designed to have a length that will continue to apply tension in the elevated position shown in FIG. 2, adding another method of ensuring that pivotal arms 108 do not rotate into the lowered minimum position unless intended by the user.

To ensure even raising of base 102 and only require one lever 112, pivotal arms 108 on a first side of base 102 are coupled to like pivotal arms 108 on the opposite or distal side of base 102 through axle rods 109. These axle rods 109 are rigidly coupled to a pivotal arm 108 on each end thereof. They preferably pass through a guide or hole in base 102, and may optionally be provided with a bearing or bushing, though for most applications a bearing is unnecessary. While only one axle rod 109 is required to actuate the opposing pivotal arms, the provision of additional axle rods ensures more even transmission of forces to the distal side.

An angle in the attachment between expansion lever 112 and pivotal arm 108 allows expansion lever 112 to be easily gripped by a user when ice house base 102 is in the minimum lowered position, without interference from brackets 106 or pivotal arms 108.

Figure 4:
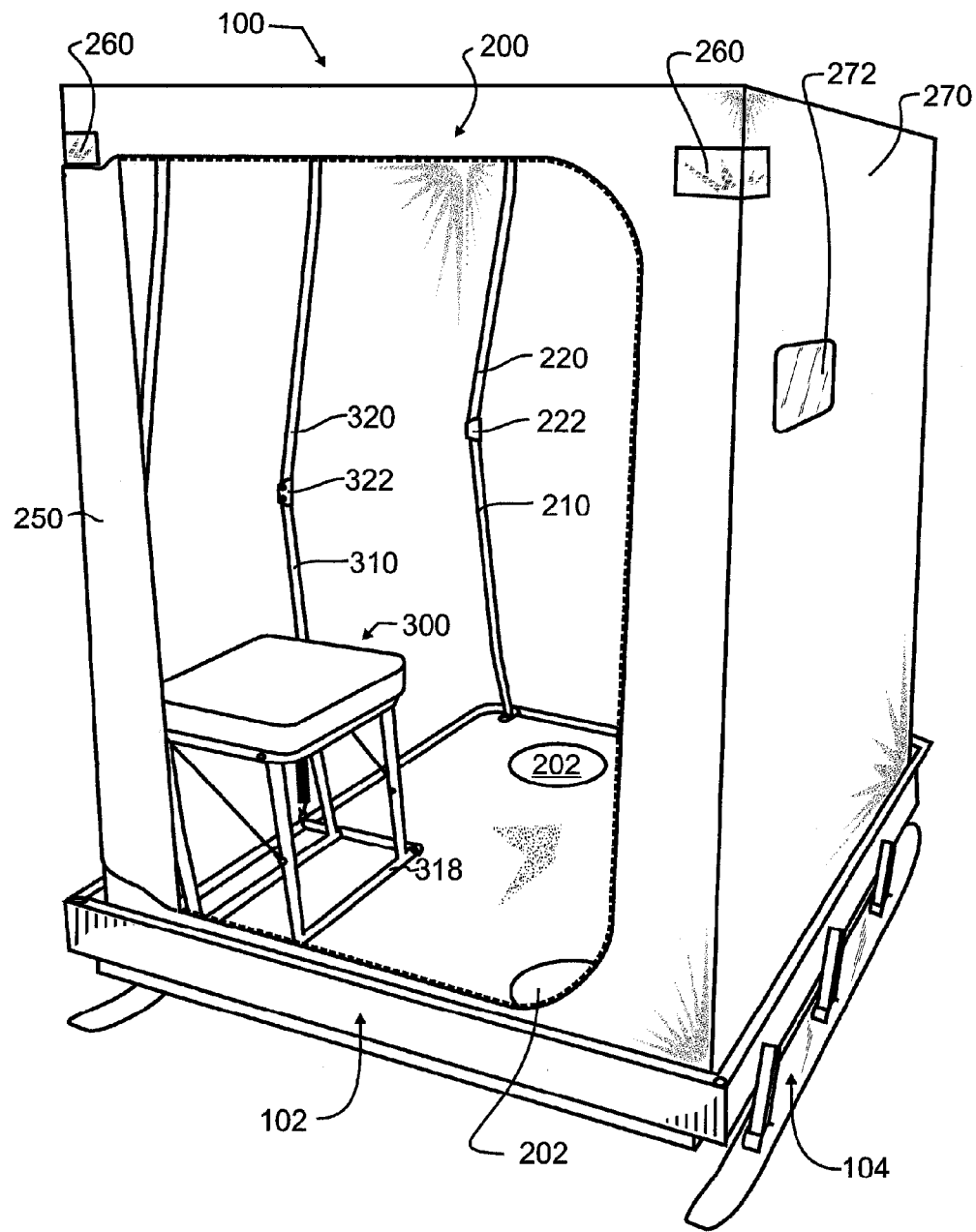
FIG. 4 illustrates the preferred embodiment ice fish house base and expansion lever of FIG. 1 from a back and slightly right perspective view, with the preferred pop-up shelter in an open and operative position.

FIG. 4 illustrates the preferred embodiment ice fish house base 102 in further combination with a preferred pop-up shelter 200. This shelter has a metal framework that through pivotal motion will either lower or raise a material cover 270 such as nylon, plastic sheeting, canvas or the like to form a covering over the ice house base. The lower wall support rods 210, 310 are coupled to the upper wall support rods 220, 320 by hinges 222, 322. The hinges are designed to bend a few degrees beyond 180 degrees so that the upper and lower wall supports 210, 310, 220, 320 may be extended to a maximum height and then beyond, slightly shortening the height of material cover 270 and forming a minor bowing out of the material cover 270 walls. The hinges 222, 322 are the most lateral point on the wall support. This allows gravity to hold the material cover 270 and wall supports in place when in use because the gravitational forces attempt to overextend the hinges 222, 322.

When being moved to the lowered position, hinges 222, 322 move medially towards the opposite wall and downward, while the upper wall support rods 220, 320 fold laterally outward and downward until the lower support rods 210, 310 and hinges 222, 322 rest on the ice house base 102 and the upper support rods 220, 320 rest on the lower support rods 210, 310.

To raise the preferred pop-up shelter 200, a lift assist spring 302 shown in FIG. 3 is affixed to lower wall support rod 310 and applies tension to pull the pop-up shelter 200 into an open and operative position. When in the collapsed, stowed position, the weight of pop-up shelter 200 applies pressure to keep the spring down. Additionally, a bend in the lower portion of the lower support rod 310 allows the lower support rod to be above the lift assist spring 302 while in the stowed position, so that the lift assist spring 302 applies tension along and below lower support rod 310. To raise the pop-up shelter 200, a user needs to lift lower support rod 310 to a point where the lift-assist spring 302 is no longer below or in-line with the lower support rod 310, at which point the lift-assist spring 302 will apply forces that encourage lateral rotation of the lower support rod 310 and the pop-up shelter 200 will expand to the operative position. It is desirable that lift-assist spring 302 continues to apply tension when pop-up shelter 200 is in the operative position in order to prevent outside forces such as wind from undesirably collapsing pop-up shelter 200.

A stop cable 304 applies counter-tension to the lift-assist spring 302 when pop-up shelter 200 is in the fully operative position in order to prevent lower support rod 310 from extending too far outward.

In the preferred embodiment, lift assist spring 302 and stop cable 304 are part of a collapsible seat 300 seen in FIGS. 3 and 4. The collapsible seat 300 is affixed to lower support rod 310 and consists of horizontal base members 316, 318, vertical legs 308, cushion support 312, and cushion 314. The legs 308 are affixed to the base members 318 at a point medial to the end of the base member 318 so that when folded into the collapsed position, the legs 308 do not come into contact with base members 316 and so can be fully adjacent to ice house base 102. The bend in lower support bar 310 also prevents interference with base member 318 or other components of the seat when in the collapsed position.

While the lift assist spring 302, stop cable 304, and lower support rod 310 are part of the collapsible seat 300 in the preferred embodiment, the seat may take an alternate form and be separate from the support system for the pop-up shelter 200. Any acceptable collapsible seats known to those in the art may be used, and may be separate or entirely absent from the pop-up shelter 200.

FIG. 4 illustrates optional ice hole coverings 202. One or more holes may be provided in the ice house base to permit drilling and fishing there through. In the preferred embodiment, a collapsible chair 300 is installed near each optional ice hole covering 202 to provide comfort for the fisherman using each hole.

FIG. 4 also illustrates door 250, which may be of varying size, shape, or design to allow ingress and egress to the ice house pop-up shelter 200. In the preferred embodiment, door 250 may be unzipped from material cover 270 and secured in the open position. Optional windows 272 provide visibility and light to the interior of the pop-up shelter 200.

Additionally, reflectors 260 provide a safety feature to enhance visibility of the invention in low-light conditions, particularly at night when vehicles may be mobile on the ice.

FIG. 5 illustrates a preferred tow cord attachment 416 and tightener 412 as designed in accord with the teachings of the present invention in greater detail. As shown therein, a pair of cord attachments 416 that will capture the tow cord 410, and may take any suitable geometry from the simple hook as illustrated to fasteners, loops, boating quick ties, or any other suitable coupling, are provided coupled to the front of the ice house base 102 and spaced from each other. A cord attach tightener 412, such as a simple bungee cord but which may comprise any resilient or elastic tensioning device including springs, elastic or any other equivalent material, is preferably provided between loops or other suitable anchor points formed in the tow cord 410. The combination of simple hooks for cord attachments 416 and cord attach tightener 412 enable the tow cord to be very easily manually slipped onto the hooks and then securely held thereto by the coupling of the bungee 412 between the tow cord 410 termination loops near cord attachments 406. A loop 414 in the middle of cord 410 provides a location for attachment to an external device, such as a truck or All-Terrain Vehicle (ATV).

An ice auger receiver 430 for supporting an ice auger mount 450 is illustrated in FIGS. 5 and 6. Auger receiver 430 may simply be a suitable open tube or the like, fastened to the front of ice house base 102. The ice auger mount 450 is slipped into auger mount receiver 430 and may be held by friction and gravity, though other fasteners or locks may be provided if so desired. The ice auger mount 450 in the preferred embodiment is a generally T-shaped arm terminating at the top ends with generally v-shaped supports. An ice auger may simply be rested therein, and may, if desired, be coupled through a bungee or the like to secure the ice auger to ice auger mount 450.

FIG. 6 illustrates an alternative embodiment metal trailer tongue 420. Rigid legs 422 insert onto cord attach 416, and cord attach tightener 412 attaches to the legs 422 near the cord attach 416 in order to prevent legs 422 from coming detached from cord attach 416 at undesirable times. A swivel fastener 428 connects legs 422 together while allowing lateral rotation of the legs. Trailer coupling 424 is affixed to the swivel fastener 428 in such a way as to allow vertical rotation for proper attachment to a trailer hitch. A handle 426 provides easy manipulation of the trailer tongue 420 and trailer coupler 424 to properly position for attachment to a trailer hitch. Additionally, the handle may be used to move the invention without attaching it to a towing device.

The cord attach 416, cord 410, cord attach tightener 412, and trailer tongue 420 provide a means to move the invention. However, these embodiments are not considered to be limiting to the invention. Alternate means of transportation that are obvious to one in the art may be used, such as alternate trailer tongues or different trailer tongue attachment methods.

Figure 7:
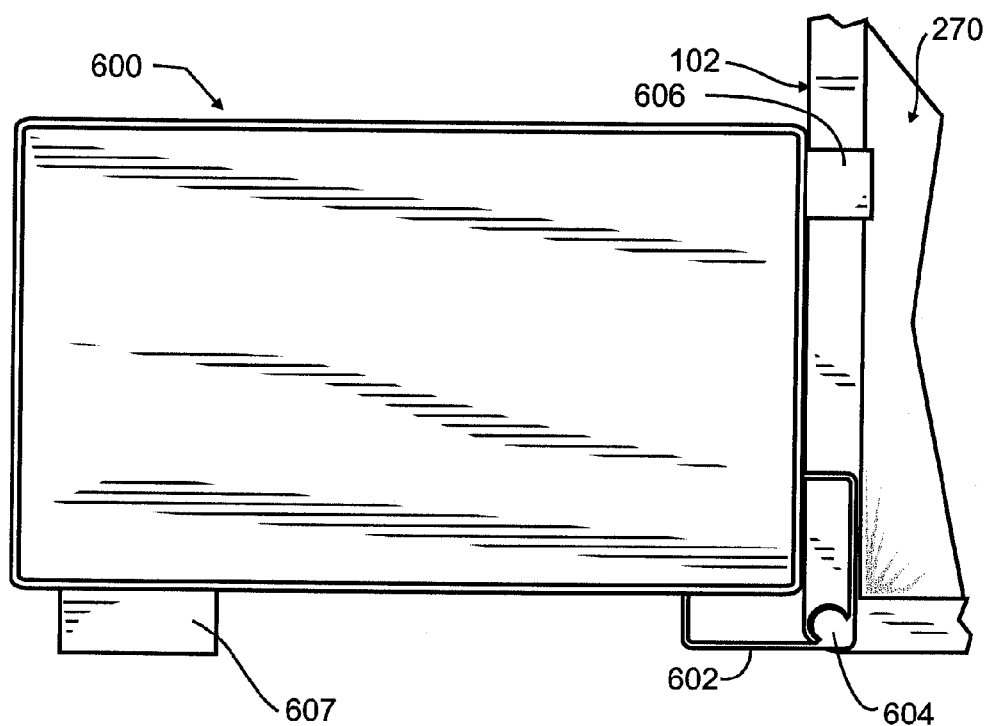
FIG. 7 illustrates a preferred embodiment accessory holder from an enlarged top view.
Figure 8:
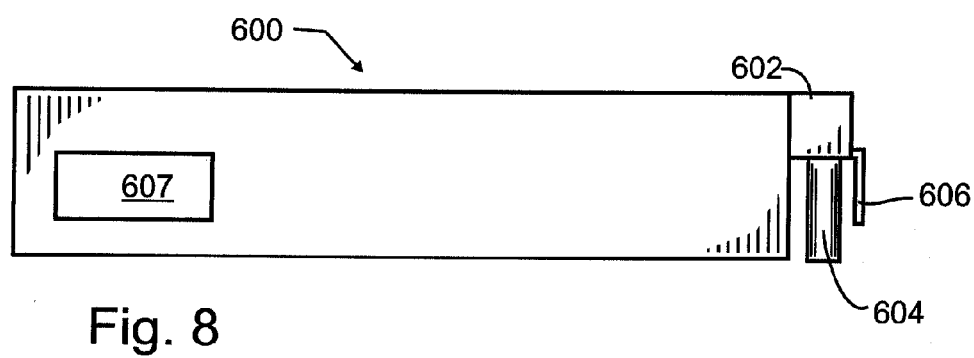
FIG. 8 illustrates a preferred embodiment accessory holder from a side elevational view.

FIGS. 7 and 8 illustrate a preferred embodiment accessory holder 600 for attachment to the ice house base 102. Accessory holder 600 consists of a rectangular bin attached to a pin 604 by a square-shaped rotational stop and coupling 602. Optional locking brackets 606, 607 may also be provided. Pin 604 is inserted into a hole on ice house base 102, preferably on a corner. The pin allows the accessory holder 600 to rotate, and the rotational stop and coupling 602 limits this rotation to approximately 180 degrees. This allows accessory holder 600 to be located either on an end or a side of ice house base 102, or at an intermediate angle. At the time of insertion of pin 604, the user may optionally engage a locking bracket 606, 607 with the edge of ice house base 102, effectively preventing accessory holder 600 from rotating. The locking brackets 606, 607 are shown here as L-shaped brackets that drop over the edge of ice house base 102, but these may be replaced with any other locking device obvious to one in the art, such as a clevis and pin attachment.

Figure 9:
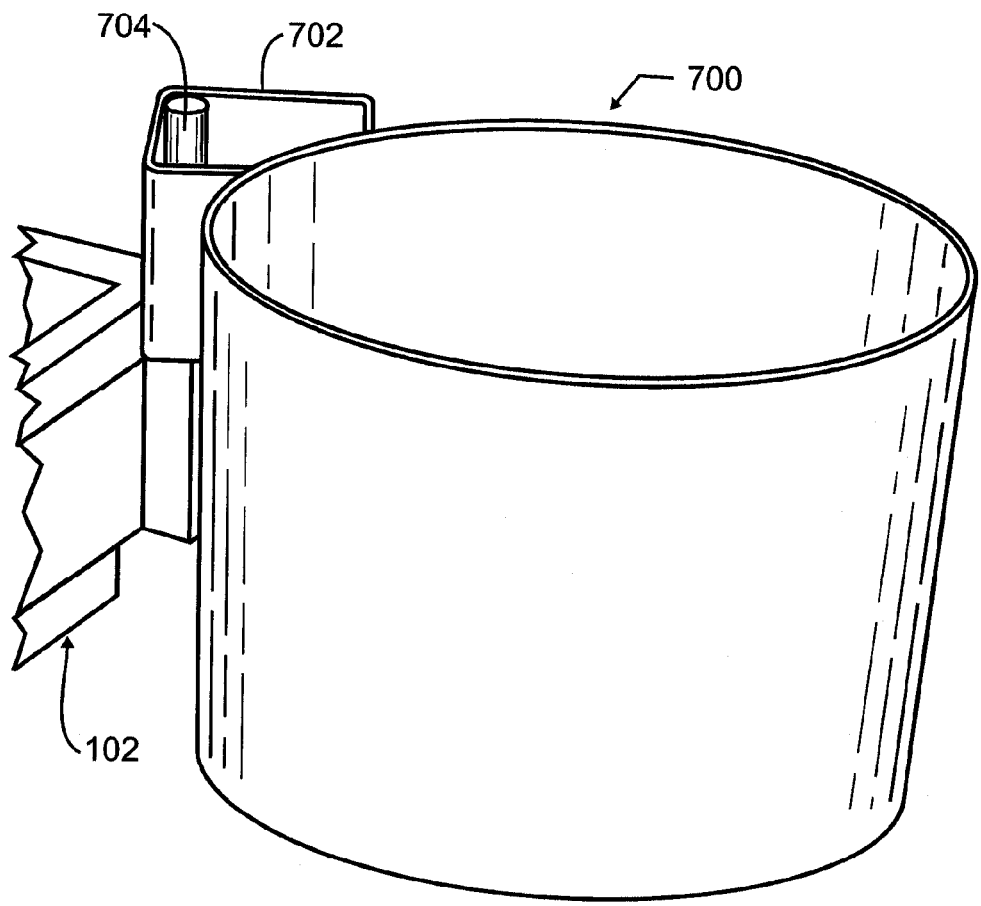
FIG. 9 illustrates an alternate embodiment accessory holder from a projected view.

FIG. 9 illustrates an alternate embodiment accessory holder 700. Accessory holder 700 consists of a round bucket rather than a rectangular bin, providing an alternate shape that may be better suited for certain uses. While not illustrated, it will be understood that accessory holder 700 may also have locking devices to prevent rotation similar to locking brackets 606, 607, or may be allowed to rotate freely.

Accessory holders 600, 700 can support a variety of accessories including but not limited to a fuel tank, fishing bait, fishing supplies, and tools. The shape and design of the accessory holders 600, 700 described here is not intended to be limiting, and alternate accessory holders obvious to one in the art may be substituted, or accessory holders may be excluded altogether.

In use, a person may first readily attach tow cord 410, insert ice auger mount 450 and place an ice auger thereon, and then raise ice house base 102 from skis 104 by pivoting expansion lever 112 counter-clockwise in the view of FIG. 1 to the position illustrated in FIG. 2. At this point, a tow vehicle such as an All-Terrain Vehicle (ATV) or the like may be used to tow ice house 100 across snow and ice, and into a desired position on a frozen lake or river. Once in the desired position, expansion lever 112 is pivoted in a clockwise direction in FIG. 2, lowering ice house base 102 onto the ice and into the configuration illustrated in FIG. 1. The tow cord 410 and ice auger mount 450 may optionally be readily removed and stowed, such as in ice house base 102 or adjacent thereto. Pop-up shelter 200 is raised to the open and in-use position as illustrated in FIG. 4. The ice auger is used to drill a hole through the optional ice hole 202, either before or after lowering the ice house base 102 onto the ice. The fisherman may then fish. When the house needs to be moved, through a few simple manipulations of pressing pop-up shelter 200 down into ice house base 102 and raising expansion lever 112 to the position of FIG. 2, house 100 may be raised above skis 104 and transported once more.

Optionally, a closure lock or other securing device may be installed to hold skis 104 in the position most close and adjacent the ice house base 102. When the ice house base is lifted up from the ground such as for transport in the bed of a pick-up truck or the like, the skis and pivotal arms will stay put and not pivot. As may be appreciated, in the hardware arts there are a multitude of other ways to lock the pivotal arms and skis in place and prevent movement relative to the ice house base, and each of these alternatives are considered to be incorporated herein as well.

From the foregoing figures and description, several additional features and options become more apparent. First of all, ice fish house base and expansion lever 100 may be manufactured from a variety of materials, including metals, resins and plastics, ceramics or cementitious materials, or even combinations, laminates or composites of the above. The specific material used may vary, though it is preferable that all materials are sufficiently tough and durable to not fracture, even when great forces are applied thereto through wide temperature extremes. Furthermore, the materials will preferably be resistant to the elements, and will not corrode or otherwise fail in normal use. While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. An ice fish house base and expansion lever, comprising:
    a first ski and a second ski;
    a first pair of arms pivotally coupled between and to each of said first ski and said ice house base;
    a second pair of arms pivotally coupled between and to each of said second ski and said ice house base;
    a link between said first pair of arms and said second pair of arms transmitting a rotary movement of said first pair of arms relative to said ice house base from said first pair of arms to said second pair of arms to thereby cause a rotary movement of said second pair of arms relative to said ice house base; and
    a stop limiting said rotary movement of said first pair of arms relative to said ice house base from a position where a bottom of said ice house base is adjacent to a bottom of said first ski to a position where said ice house base weight maintains said stop.

2. The ice fish house base and expansion lever of claim 1, wherein said first pair of arms pivot from generally parallel to said first ski more than ninety degrees, said ice house base weight maintaining said stop subsequent to said first pair of arms passing from generally parallel to said first ski to beyond perpendicular to said first ski.

3. The ice fish house base and expansion lever of claim 2, further comprising a manual lever extending from at least one of said first pair of arms.

4. The ice fish house base and expansion lever of claim 1, further comprising a lift assist spring applying a biasing force tending said first pair of arms towards said stop and thereby tending to lift said ice house base above said first and second skis.

5. The ice fish house base and expansion lever of claim 1, wherein said pair of pivotal arms are pivotally coupled to said first ski distally from each other along said first ski to allow flexure and bend within said first ski, thereby enabling improved surface travel over irregularities.

6. The ice fish house base and expansion lever of claim 1, further comprising:
    an ice auger receiver coupled to said ice fish house base; and
    an ice auger mount coupled through said ice auger receiver to said ice fish house base;
    said ice auger receiver having a generally tubular receiver into which a generally tubular coupler member of said ice auger mount is received; and
    said ice auger mount having first and second bifurcated arms that operatively support distal portions of an ice auger nested therein.

7. The ice fish house base and expansion lever of claim 1, further comprising a quick attach tow cord coupling for coupling said ice fish house base to a towing vehicle, said quick attach tow cord coupling comprising:
    a pair of distally spaced and oppositely facing u-shaped hooks anchored to said ice fish house base;
    a flaccid cord having loops at each terminus;
    said flaccid cord loops each engaging one of said distally spaced u-shaped hooks;
    a coupling intermediate to said termini and operatively engaging with said towing vehicle; and
    an elastic tensioning member affixed at a first terminus intermediate to a first flaccid cord terminus and said intermediate coupling and at a second terminus intermediate to a second flaccid cord terminus distal to said first flaccid cord terminus and said intermediate coupling and applying tension there between.

8. In combination, an ice fish house base, an ice auger receiver coupled to said ice fish house base, and an ice auger mount coupled through said ice auger receiver to said ice fish house base, said ice auger receiver comprising:
- a generally tubular receiver into which a generally tubular coupler member of said ice auger mount is received;
- said ice auger mount having first and second bifurcated arms spaced apart from each other and operatively supporting distal portions of an ice auger nested therein;
- wherein said generally tubular receiver further comprises rectangular cross-section hollow tubing defining a female opening into which a rectangular cross-section extension from said ice auger mount is inserted and received.

9. A quick attach tow cord coupling for coupling a trailer to a towing vehicle, comprising:
- a first hook anchored adjacent a first end to a point on said trailer displaced from a vertical plane extending through a trailer longitudinal mid-line and extending from said first hook first end towards said vertical plane to a first hook midpoint and then extending away from said vertical plane to a first hook terminus more distal from said vertical plane and also distal to said first end;
- a second hook anchored adjacent a first end to a point on said trailer displaced from said vertical plane and on an opposite side of said vertical plane than said first hook first end and extending from said second hook first end towards said vertical plane to a second hook midpoint and then extending away from said vertical plane to a second hook terminus more distal from said vertical plane and also distal to said second hook first end;
- a flaccid cord having loops adjacent each terminus;
- said flaccid cord terminus loops each engaging one of said first and second hooks;
- a flaccid cord coupling intermediate to said flaccid cord termini and operatively engaging with a towing vehicle; and
- an elastic tensioning member affixed at a first terminus intermediate to a first flaccid cord terminus and said intermediate coupling and at a second terminus intermediate to a second flaccid cord terminus distal to said first flaccid cord terminus and said intermediate coupling and applying tension there between.

\* \* \* \* \*